July 21, 1953  E. J. HIRVONEN  2,645,981
HYDRAULIC INDEXING MECHANISM
Filed Jan. 5, 1949  8 Sheets-Sheet 1

INVENTOR.
ERIC J. HIRVONEN
BY Charles P. Fay,
Attorney

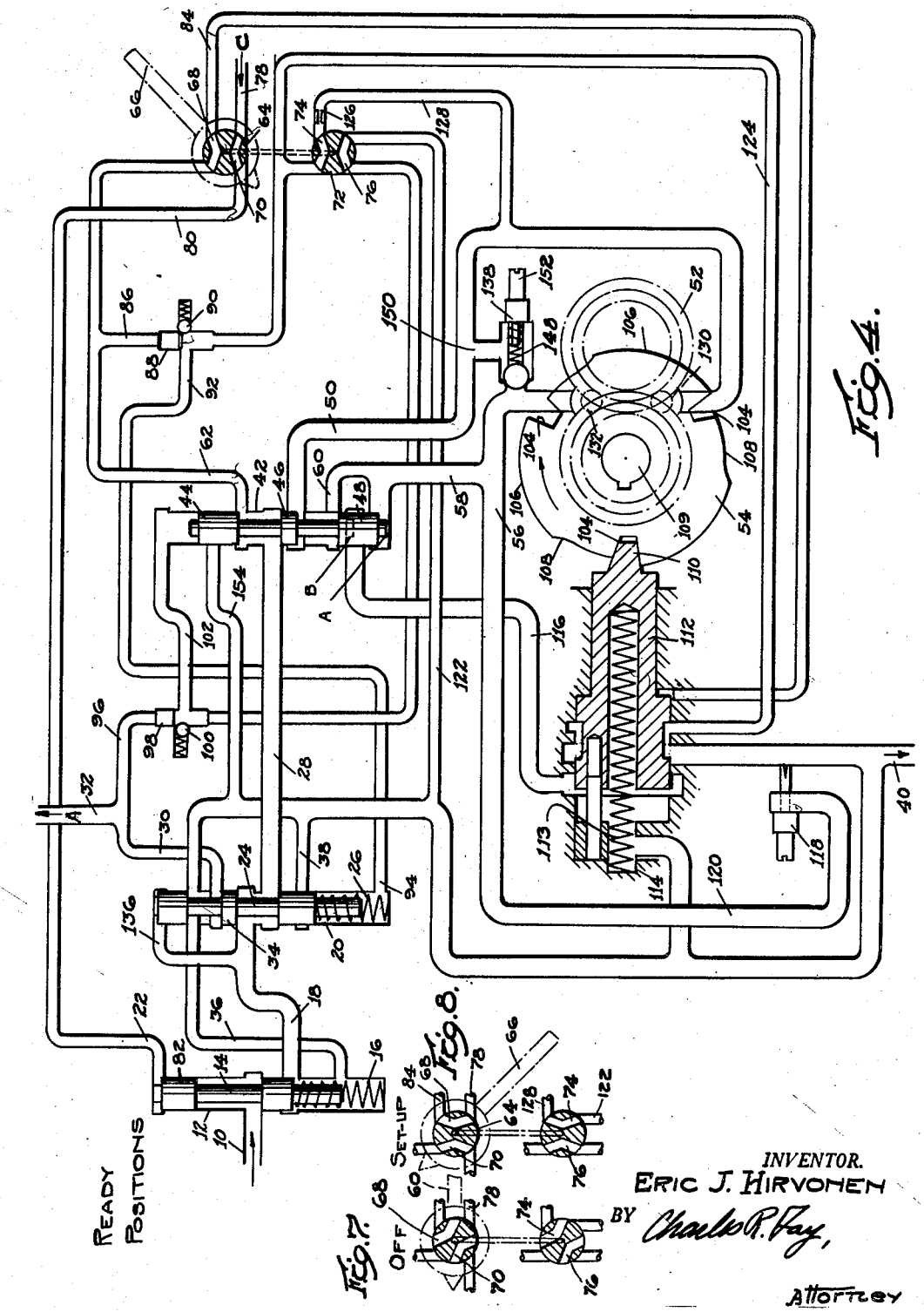

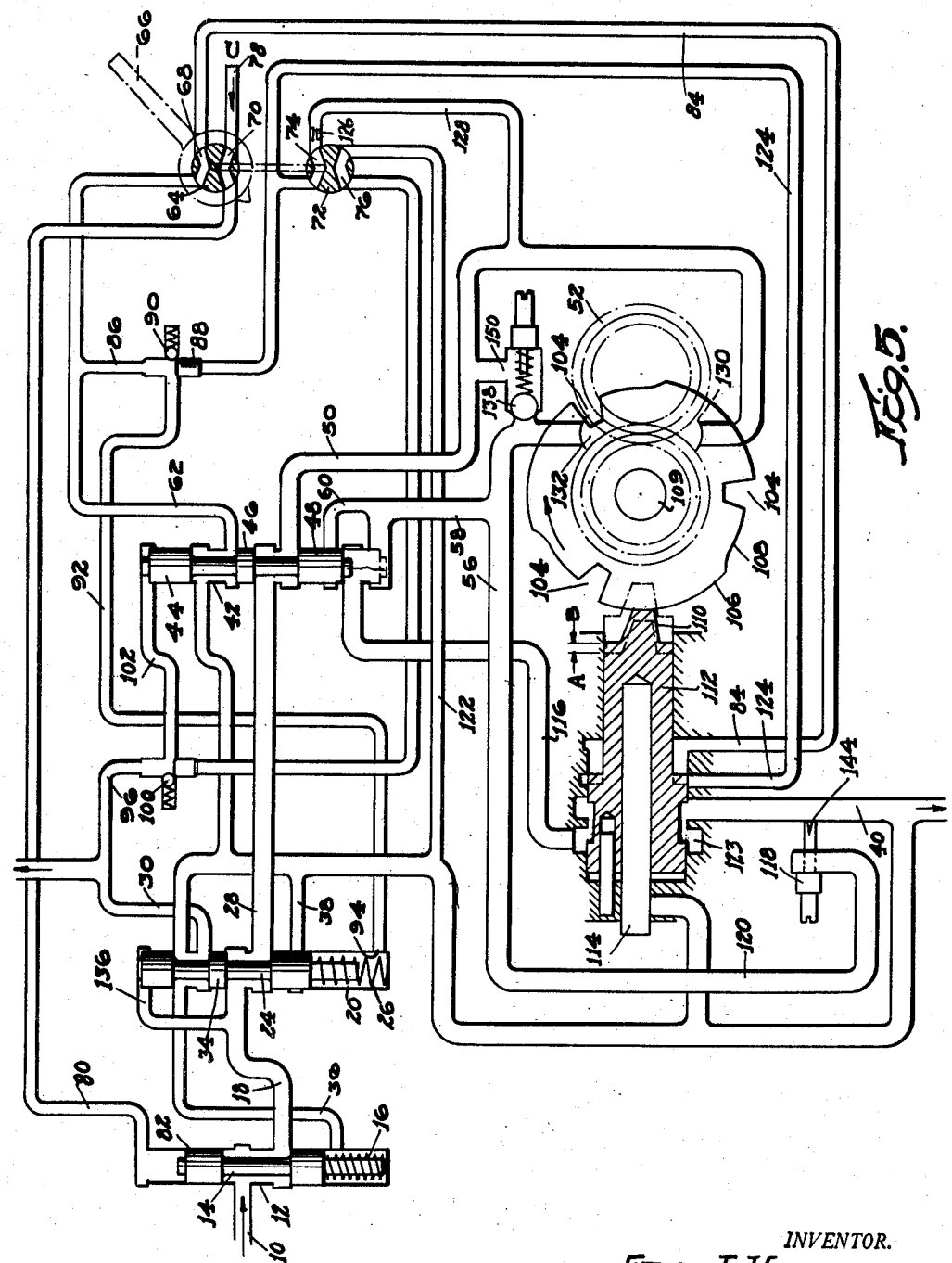

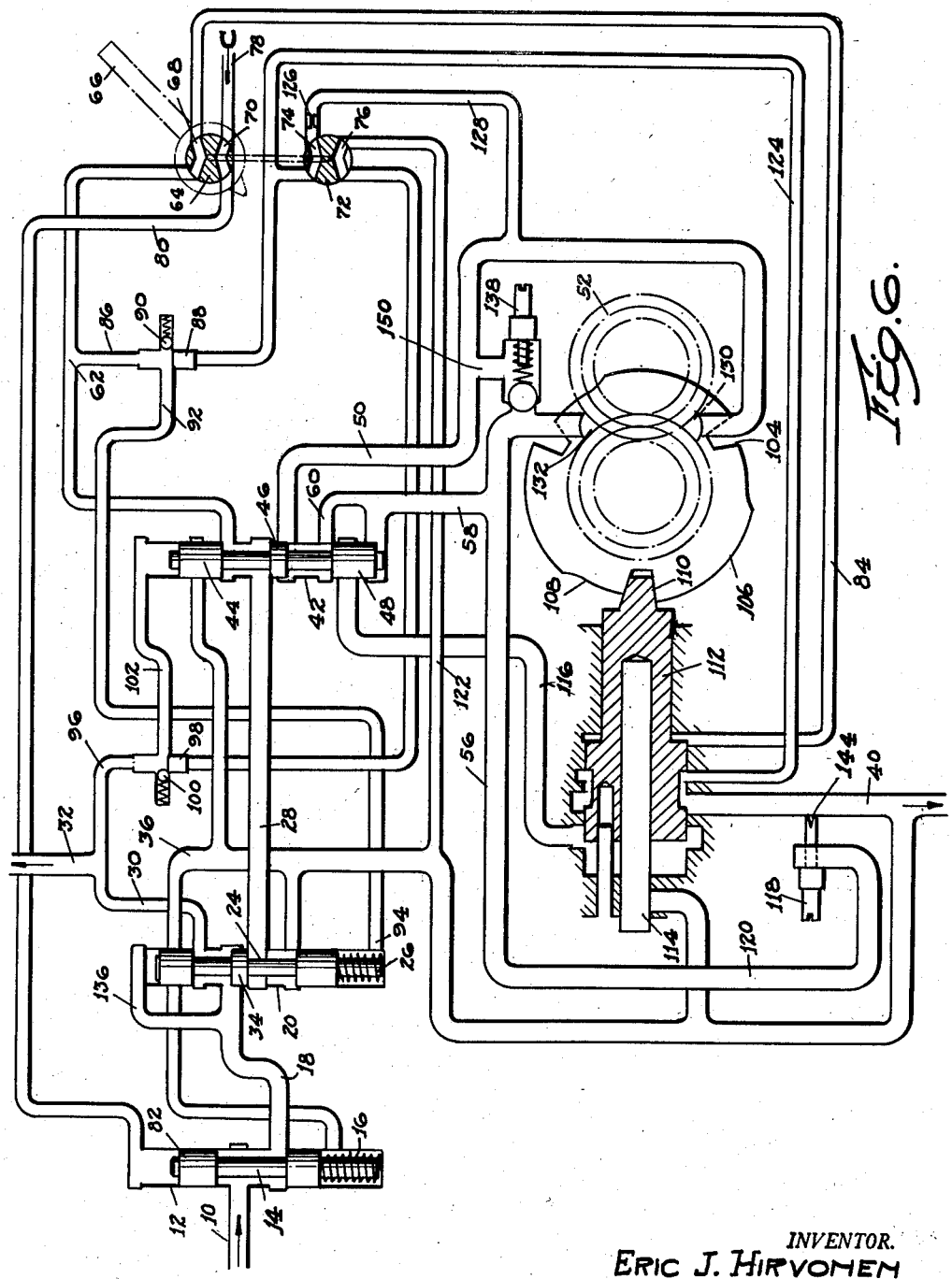

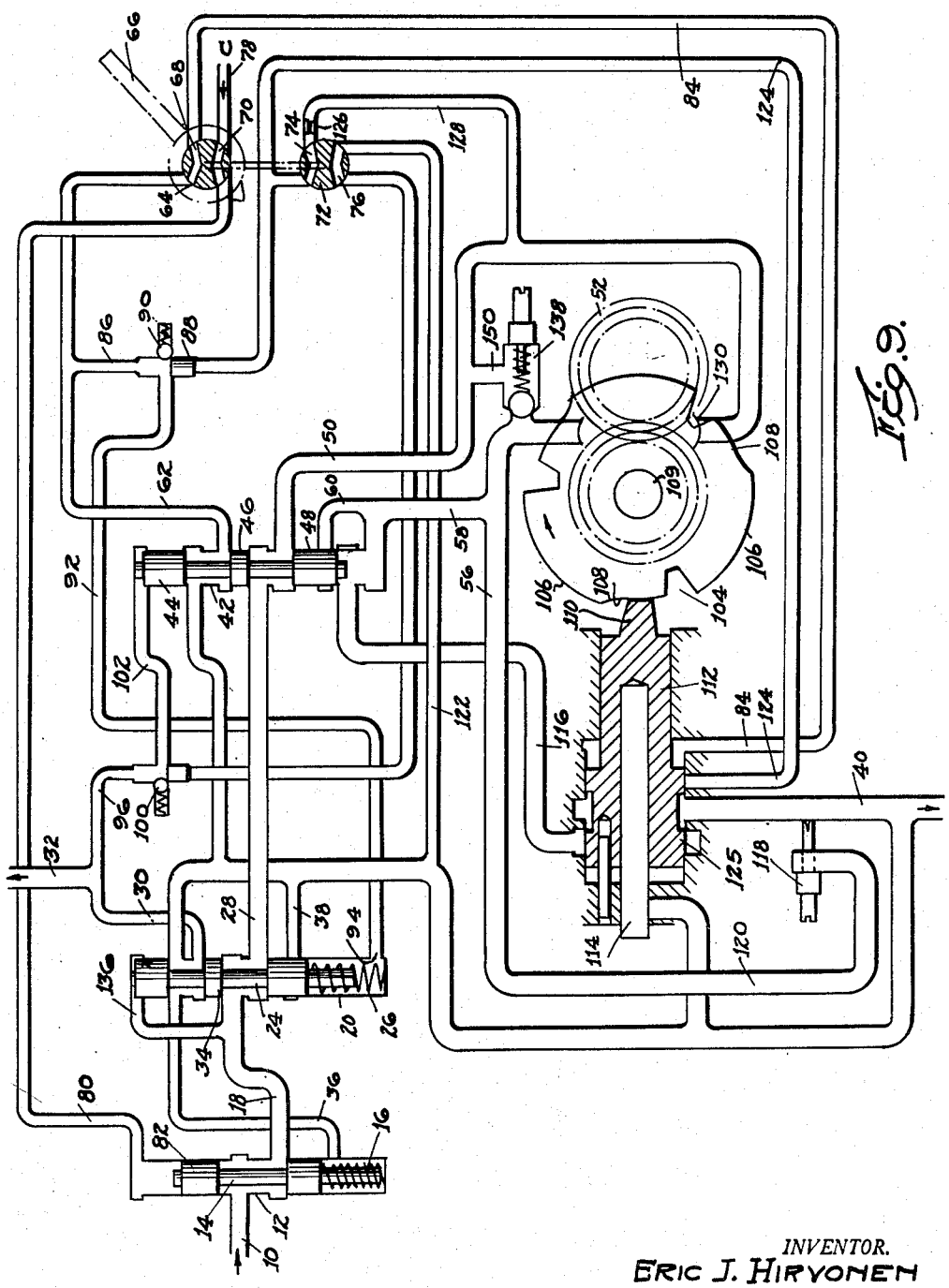

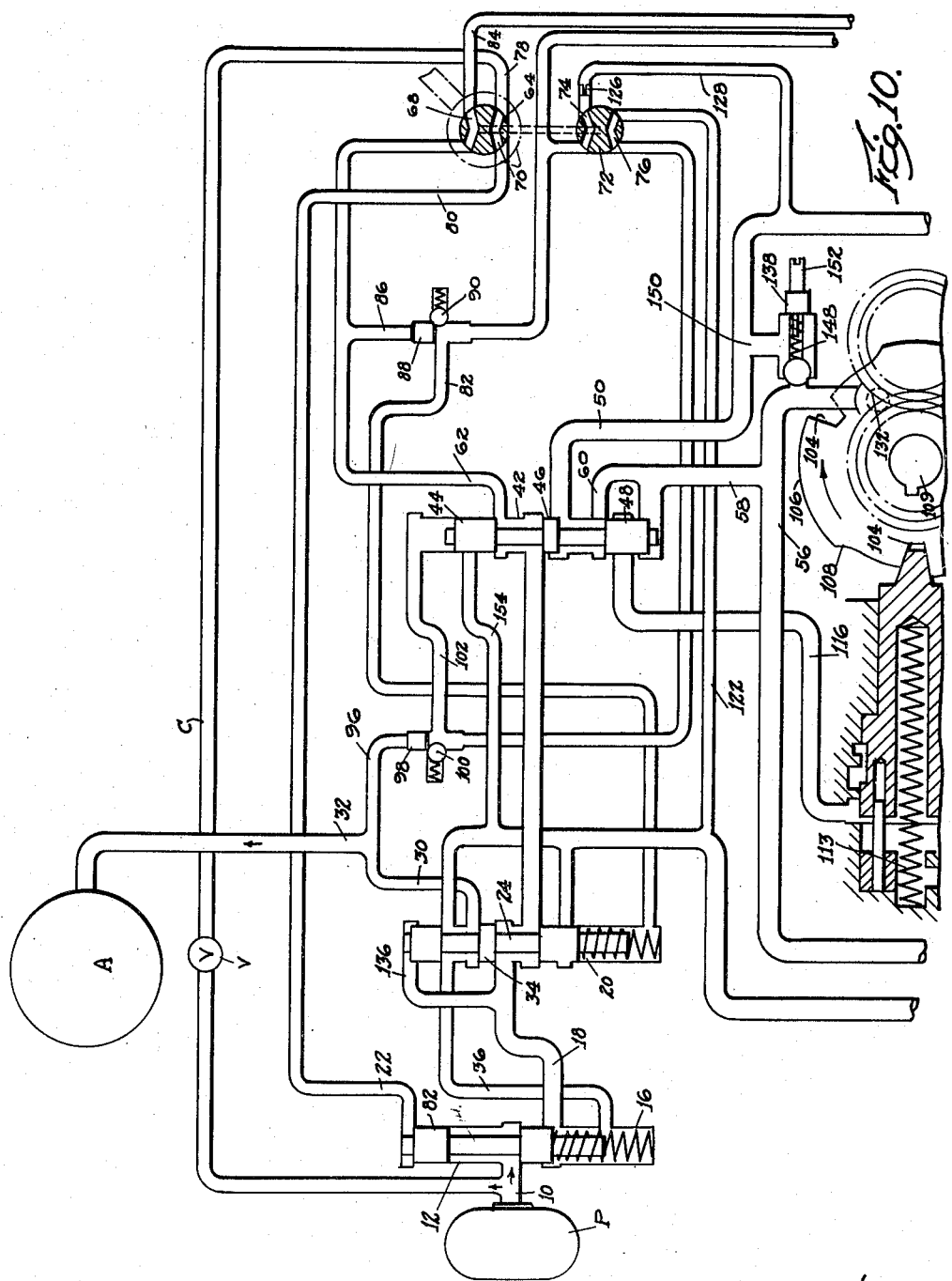

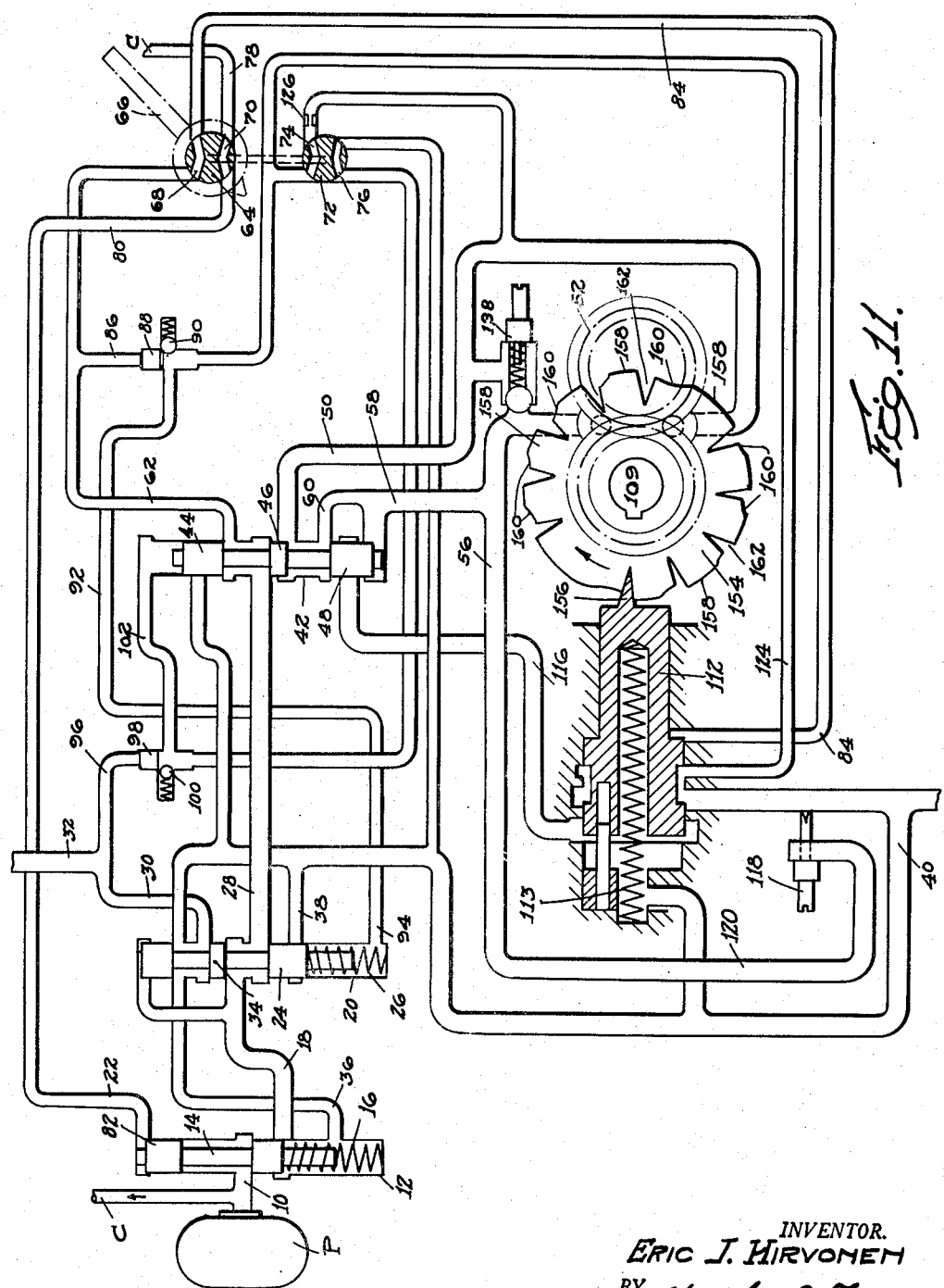

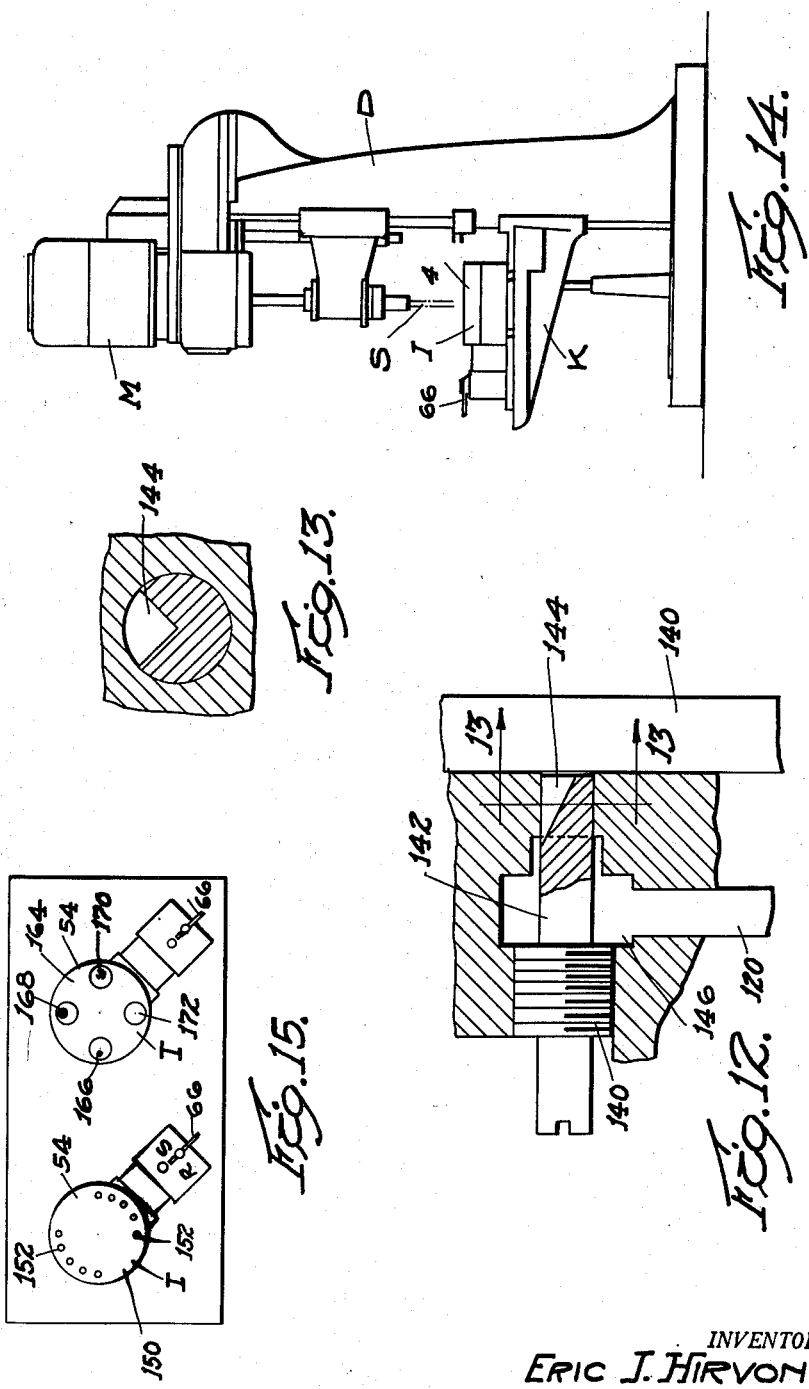

Patented July 21, 1953

2,645,981

UNITED STATES PATENT OFFICE 2,645,981

HYDRAULIC INDEXING MECHANISM

Eric J. Hirvonen, Shrewsbury, Mass., assignor to Leland-Gifford Company, Worcester, Mass., a corporation of Massachusetts Application January 5, 1949, Serial No. 69,357

16 Claims. (Cl. 90—56)

This invention relates to hydraulic control systems for indexing tables such as work tables for machine tools particularly drills, milling and boring machines, etc. The principal object of the invention resides in the improvement of operation of production tools as to the work tables, carriages, etc., thereof, and increasing the speed, accuracy, and production of machined parts, especially those requiring more than one operation, e. g., drilling, counterboring, tapping, etc., and those requiring a plurality of like operations, e. g., a series of even or irregular spaced drilled holes, the improved operation residing in increased speed of indexing between work pieces or work stations and in the accuracy and positiveness of locking of the table between indexing steps.

Another object of the invention resides in the provision of hydraulic means to release the index table locking means to move the index table at high speed for a predetermined interval, to slow the indexing movement thereof, and to relock the table, the slow down taking place just prior to the relocking and obviating shock and wear and allowing the use of very high indexing speeds not heretofore possible.

A further object of the invention resides in the provision of a rotary work table, a travelling tool therefor, a hydraulic motor for the table, a cam driven by the motor, a series of slots in the cam, said slots being either regularly or irregularly spaced depending on the work to be done as will appear more fully hereinafter, a cam follower pin receivable in the slots one after the other, hydraulic means controlled by the position of the tool to retract the pin, hydraulic means moving the pin reversely to bear on the cam between slots, a low point on the cam just prior to the sequential slot, said pin of course moving still farther reversely according to the low point, and hydraulic means to slow the motor controlled by the last movement of the pin, just prior to the latter dropping into the sequential slot.

Other objects and advantages of the invention will appear hereinafter.

Reference is to be had to the accompanying drawings, in which

Fig. 4 is a diagrammatic view of the hydraulic mechanism of the machine illustrating the parts at rest but ready to operate;

Fig. 5 is a view similar to Fig. 4 showing the parts in operation;

Fig. 6 is a diagram similar to Fig. 4 but showing the parts in another position;

Fig. 7 is a diagrammatic view of the hand-operated valves in off position;

Fig. 8 is a view of the same valves in "set-up" position;

Fig. 9 is a diagrammatic view showing the hydraulic system in slow rotational position relative to the work table;

Fig. 10 is a view similar to Fig. 4 with parts omitted but showing the relation of the hydraulic system to a machine tool;

Fig. 11 is another view like Fig. 4 but showing a different cam;

Fig. 12 is an enlarged section through the adjustable regulating valve;

Fig. 13 is a section on line 13—13 of Fig. 12;

Fig. 14 illustrates a drilling machine to which the present invention is applied; and Fig. 15 is a top plan view of a machine to which the indexing table of the present invention is applied.

Figure 1:
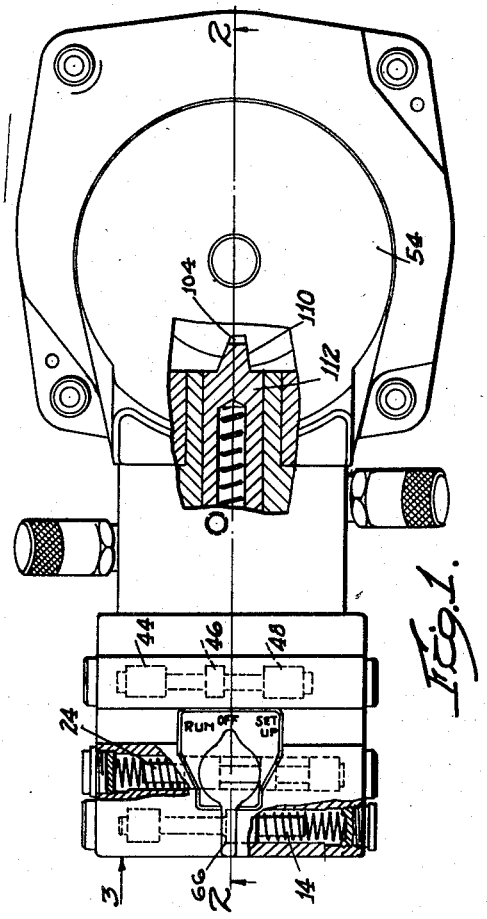
Fig. 1 is a plan view of an index table embodying the present invention, parts being in section.
Figure 2:
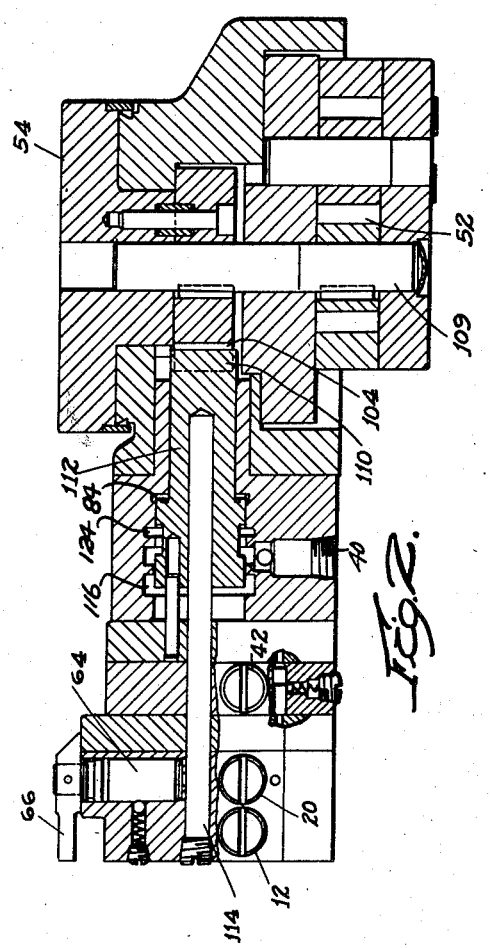
Fig. 2 is a vertical section on line 2—2 of Fig. 1.
Figure 3:
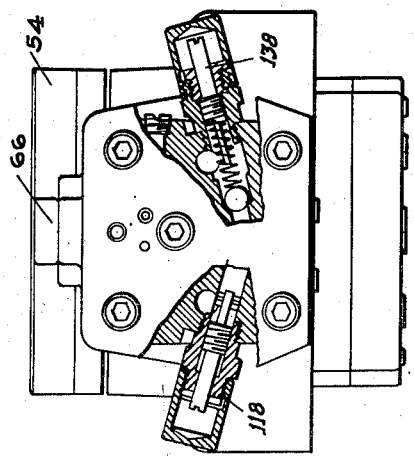
Fig. 3 is a view in elevation looking in the direction of the arrow 3 in Fig. 1, parts being in section.

By way of illustration, a drilling machine D is provided with a knee K on which is located the present indexing device I, the machine having a spindle S rotated by motor M and traversed by a piston in a cylinder A. The drill spindle, when up, in non-drilling position, opens a valve V to provide an impulse to line C from the pump P.

A source of fluid pressure which may be the pump P, is indicated as entering the machine as, for instance, at 10 and this fluid under pressure enters a valve housing 12 having a valve stem 14 normally held in the up position shown in Fig. 4 by means of a spring 16. This stem 14, when in the Fig. 4 position, blocks a passage 18, the latter leading to a second valve housing generally indicated at 20. The valve 14 may be urged downwardly by fluid pressure in a line 22 entering the top of housing 12.

The valve housing 20 is provided with a valve stem 24 normally held in its uppermost position by means of a spring 26 which normally leaves a line 28 open and closes a line 30, the latter leading to a line 32 going to the drill cylinder A to operate the same. In this way, when pressure is applied to line 32, the spindle S descends to operate on a workpiece, as will be understood by those skilled in the art. The passage 30 is closed by a valve part 34. Valve housings 12 and 20 have drains 36 and 38 leading to drain 40.

The line 28 leads to a third valve housing generally indicated at 42 and this valve housing is provided with a valve stem having elements 44, 46 and 48, the element 46 closing a passage 50 which leads to a hydraulic motor 52 from passage 28, when the valve 42 is in the Fig. 4 position. An element of motor 52 is directly connected to and serves to rotate the work table 54. The hydraulic motor is provided with an exhaust line 56, a branch 58 of which leads back to the valve housing 42 at the bottom thereof, and another but smaller branch 60 leads to the top of element 48 in Fig. 4.

With the valve stem in housing 42 in the position shown in Fig. 4, the line 28 communicates with a smaller line 62 which passes through the element 64 of a rotary valve having a handle 66, this valve having passages 68 and 70. The valve element 64 is connected directly to valve element 72 having passages 74 and 76 so that the valve elements 64 and 72 are rotated together by the handle 66. The valve elements 64 and 72 are actually the same part but for purposes of explanation they are shown separate.

The passage 70 connects an incoming line 78 connected to line C, with a passage 80 which leads back to the top of valve housing 12 at one side of the valve element 82 therein. The impulse of line C is therefore transmitted to the element 82.

The passage 68 is used to connect line 62 with a line 84 in running position of the handle 66, but if the handle is turned to the "set-up" position, line 84 is connected with line 78, see Fig. 8, so that the fluid impulse above described will proceed directly to the line 84 rather than to the line 80 to unlock the index table as will be more apparent hereinafter, to allow for setting up.

The line 62 has a branch 86 containing a plug valve 88 normally held in the position shown in Fig. 4 by the spring-pressed detent 90 but which when moved down by pressure in line 62 connects line 86 with a line 92, leading to the bottom of valve housing 20 as at 94, see Figs. 5 and 6.

The line 30 also has a branch at 96 with a plug valve 98 therein held in its upward position by means of a spring-pressed detent 100 but which when pressed down will connect line 96 with a line 102 going to the top of valve housing 42 above the element 44.

The worktable 54 is provided with a cam having a plurality of radial slots 104 and a peripheral cam surface having two main portions, one at 106 and one at 108, these surfaces being at unequal radial distances from the axle 109.

The slots 104 are for the reception of tip 110 of an index pin 112, the same being spring-pressed to the right by a compression spring 113 located in a base 114. Pressure in line 84 will move the index pin 112 to the left and pressure in line 116 leading from the bottom of valve housing 42 will push the index pin 112 to the right in addition to the action of the spring 113.

The reference numeral 118 indicates an adjustable flow regulating valve located in the drain 120 and connected with the drain 40. The line 122 leads to the drain also.

Assuming that the drill or other machine tool is at its topmost or inoperative position, the above mentioned impulse is applied to the pipe line 78, which impulse proceeds through the pipe 80 to 22 and acts upon the valve element 82 to push the valve 16 down connecting the pressure line 10 with the pipe 18. The oil then continues through valve 20 and pipe 28 to line 62; and the plug valve 88 is pushed down allowing oil to go to the bottom of the valve housing 20 and push the valve element 24 up, keeping it there for the cycle. The oil proceeding through the line 62 goes through the valve 64, now in "run" position, to the pipe line 84 and pushes the index pin 112 to the left out of the slot 104 in which it has been located. When the index pin is forced back by the pressure of the oil in the pipe line 84, the oil then goes from the line 84 to the line 124, see A position, Fig. 5, back through the valve element 72 through passage 74 through a constriction 126 in a pipe 128 to the inlet port at 130 of the hydraulic motor, initiating rotation thereof.

The fluid passing through the hydraulic motor builds up pressure at exhaust port 132 thereof in the line 58 so that the valve stem in housing 42 is pushed up, clearing the line 50 by reason of element 46, see Fig. 5, so the hydraulic motor then receives the full pressure from line 28, speeding up the rotation of the work table. At the same time, however, the line 116 is opened and this causes oil pressure to bear on the back of the index pin 112 which is, therefore, pushed to the right to ride on the cam surface 106 of the index table, the cam and table rotating clockwise. As long as the index pin rides on surface 106, the rotation of the work table is at top speed, line 116 being open to drain 40 through the pin 112 at 123.

Line 116 is substantially fully open to the drain at 40 when the pin 112 rides on cam surface 106, see Fig. 5, wherein the distance A—B is the distance of overrun to the left of the pin 112. When the recessed cam surface 108 moves to the pin, the latter is moved to the right a sufficient distance to close off the drain 40 from line 116, see 125 in Fig. 9, so that the pressure in line 56 rises and as thus far described, the fluid can only escape to the drain through the regulating valve 118. This valve is adjustable by a screw 140 which acts to extend or retract a stem 142 having a V-shaped tapered port 144 by which means the pressure may be regulated depending on the size or orifice presented thereby to the chamber 146 receiving the fluid from line 120.

The high pressure in line 56 causes the motor to slow down, slowing the rotation of the table 54, and the excess fluid opens ball valve 138 against the action of its spring 148 and flows into pipe 50 through port 150 and back through the motor. The spring 148 may be adjusted by a screw 152.

As soon as the index pin at 110 drops in the next slot the pressure under the valve element 24 is cut out because the index pin disconnects the line 84 from 124. This valve is then positioned down because of the top pressure thereon in the pipe 136. This allows an impulse of oil to pipe line 32 which causes the drill spindle piston in cylinder A or other machine tool element to start and the plug valve 98 is also pushed down providing for oil in line 102 to push the valve 44 down. As soon as the drill spindle starts down, however, the pressure which is controlled by the drill unit cuts out and no oil passes through the valve element 64. Therefore, the valve element 14 goes up due to the spring 14 and the device is ready for the next cycle, the plug valves 88 and 98 having received impulses sufficient to move them back to original positions.

The table indexes, stops for the drill or other tool and indexes again, as long as the pump P supplies line C, so that it is merely necessary to put an operator operated shut-off valve in line C to stop and start the entire machine. This valve is usually the regular foot-operated on and off valve.

Referring to Fig. 15, two different kinds of work are illustrated. At 150 is shown a machined part having two series of holes 152, produced by passes of the drill according to the cam 154 in Fig. 11. In this case, the steps are so many as to cause it to be convenient to narrow the tip 156 of the pin 112, but the cam surfaces are the same as before, i. e. with high spots 158 and low spots 160. The spacing of the slots 162 may of course be varied to suit conditions and each of the holes 152 could be at any odd or even spacing desired.

At 164 there is shown a more usual type of work, i. e. a four station multi-tool set up where drilling is done at 166, counter-boring at 168, and tapping at 170, the station 172 being for loading and unloading. Of course this is only illustrative as a great many other operations may be done by a similar set up.

In any case, the indexing device is set angularly on the table to keep the housing and handle 66 out of the way of the operator and allow him to keep close to the work.

Having thus described my invention and the advantages thereof, I do not wish to be limited to the details herein disclosed, otherwise than as set forth in the claims, but what I claim is:

1. A hydraulic system for indexing a table comprising a hydraulic motor to drive the table, a cam moved by the motor, means forming a series of slots in the cam, a cam follower pin receivable in the slots seriation as the cam moves past the pin, a valve, hydraulic means to move the valve, a source of hydraulic power, said valve connecting the source to the pin moving the pin out of the slots to unlock the table, hydraulic means in sequence moving the pin reversely to bear on the cam, a line to apply fluid to the motor, said pin opening the line as it moves away from the cam, means to maintain the motor in operation, and a low spot on the cam just prior to the sequential slot allowing the pin to move farther reversely, a drain for the motor, the pin substantially closing the drain in the last named movement thereof whereby pressure is built up at the motor outlet side and the motor is slowed just prior to the pin dropping into the sequential slot.

2. A hydraulic system for indexing a table comprising a hydraulic motor to drive the table, a cam on the table and movable therewith, means forming a series of slots in the cam, a cam follower pin receivable in the slots seriation as the cam moves past the pin, a valve, hydraulic means to move the valve, a source of hydraulic power, said valve connecting the source to the pin moving the pin out of the slots to unlock the table, hydraulic means in sequence moving the pin reversely to bear on the cam, a line to apply fluid to the motor, said pin opening the line as it moves away from the cam, means to maintain the motor in operation, and a low spot on the cam just prior to the sequential slot allowing the pin to move farther reversely, a drain for the motor, the pin substantially closing the drain in the last named movement thereof whereby pressure is built up at the motor outlet side and the motor is slowed just prior to the pin dropping into the sequential slot, and an adjustable flow valve and an adjustable relief valve in the outlet side of the motor.

3. A hydraulic system to operate an indexing table mechanism comprising a rotary table, a hydraulic motor to rotate the same, a movable plunger to lock and unlock the table at index stations, hydraulic means to move the plunger between locking and unlocking positions, the plunger having a plurality of positions when in unlocking condition, and control means for the hydraulic motor to vary the speed thereof, means operating the motor speed control means at predetermined positions only of the plunger so that said control means is dependent on the position of the plunger and the speed of rotation of the table depends on the position of the plunger.

4. A hydraulic system to operate an indexing table mechanism comprising a rotary table, a hydraulic motor to rotate the same, a movable plunger to lock and unlock the table at index stations, hydraulic means to move the plunger between locking and unlocking positions, the plunger having a plurality of positions when in unlocking condition, and control means for the hydraulic motor to vary the speed thereof, means operating the motor speed control means at predetermined positions only of the plunger so that said control means is dependent on the position of the plunger the speed of rotation of the table depends on the position of the plunger, and a cam controlling the position of the plunger when in unlocking condition.

5. A hydraulic system to operate an indexing table mechanism comprising a rotary table, a hydraulic motor to rotate the same, movable means to lock and unlock the table at index stations, hydraulic means to move the locking means between locking and unlocking positions, the latter having a plurality of positions when in unlocking condition, and control means for the hydraulic motor to vary the speed thereof, said control means being dependent on the position of the locking and unlocking means so that the speed of rotation of the table depends on the position of the last named means, a cam controlling the position of the locking and unlocking means when in unlocking condition, and interengaging means between the cam and the locking and unlocking means to lock the table at intervals.

6. Hydraulic index table mechanism comprising, a hydraulic motor for the table, a hydraulic circuit therefor, a cam, a cam follower, interengaging means between the cam and follower to lock the table at intervals, hydraulic means to move the follower to disengaged position relative to said interengaging means, hydraulic means to move the follower reversely to engage the cam, means to initiate actuation of the motor upon movement of the follower to its extreme disengaged position, and means to slow the motor upon further reverse movement of the follower as determined by the cam.

7. Hydraulic system to index a table comprising, a hydraulic motor for the table, a hydraulic circuit therefor, a cam, a cam follower, interengaging means between the cam and follower to lock the table at intervals, hydraulic means to move the follower to disengaged position relative to said interengaging means, hydraulic means to move the follower reversely to engage the cam, means to initiate actuation of the motor upon movement of the follower to its extreme disengaged position, and means to slow the motor upon further reverse movement of the follower as determined by the cam, said follower being located in the hydraulic circuit as a valve.

8. Hydraulic system for operating an indexing table comprising, a hydraulic motor for the table, a cam on the table, a cam follower in the form of a pin, said follower acting as a valve device in the hydraulic system, said follower engaging and locking the cam and therefore the table under conditions of rest, other valve means in the hydraulic system to direct fluid to the follower at opposite ends thereof to urge the follower away from and toward the cam, a hydraulic connection to the motor from the cam follower near one end thereof so that the motor is started upon movement of the follower away from the cam, hydraulic means to drive the motor at a plurality of speeds, said last named means being controlled by the follower valve device, the latter in turn being controlled by the cam.

9. Hydraulic system for operating an indexing table comprising, a hydraulic motor for the table, a cam on the table, a cam follower in the form of a pin, said follower acting as a valve device in the hydraulic system, said follower engaging and locking the cam and therefore the table under conditions of rest, other valve means in the hydraulic system to direct fluid to the follower at opposite ends thereof to urge the follower away from and toward the cam, a hydraulic connection to the motor from the cam follower near one end thereof so that the motor is started upon movement of the follower away from the cam, hydraulic means to drive the motor at a plurality of speeds, said last named means being controlled by the follower valve device, the latter in turn being controlled by the cam, said follower closing the motor drain and raising the pressure at the outlet side of the motor to slow the latter down, and a relief valve for the outlet side of the motor.

10. Hydraulic system for indexing a table comprising, a hydraulic motor for the table, a hydraulic circuit therefor, a cam, a cam follower, interengaging means between the cam and follower to lock the table at intervals, hydraulic means to move the follower to disengaged position relative to said interengaging means, hydraulic means to move the follower reversely to engage the cam, means to initiate actuation of the motor upon movement of the follower to its extreme disengaged position, and means to slow the motor upon further reverse movement of the follower as determined by the cam, said follower being located in the hydraulic circuit as a valve, and a valve operated to direct fluid pressure to an outlet, said valve being operated upon extreme reverse movement of the follower to interengaged position of the follower and cam.

11. Hydraulic system for operating an indexing table comprising, a hydraulic motor for the table, a cam on the table, a cam follower in the form of a pin, said follower acting as a valve device in the hydraulic system, said follower engaging and locking the cam and therefore the table under conditions of rest, other valve means in the hydraulic system to direct fluid to the follower at opposite ends thereof to urge the follower away from and toward the cam, a hydraulic connection to the motor from the cam follower near one end thereof so that the motor is started upon movement of the follower away from the cam, hydraulic means to drive the motor at a plurality of speeds, said last named means being controlled by the follower valve device, the latter in turn being controlled by the cam, a further valve to direct the hydraulic pressure to the motor or to an outlet, said valve being actuated by release of pressure at one side thereof, cut off by the follower in cam locking position thereof, said outlet directing pressure to an element having a cooperating action with the table.

12. Hydraulic system comprising a motor, a cam thereon, and a movable cam follower in the form of a valve, a main valve adapted to open or close the system, a line to the main valve to operate the same to open condition, a valve in said line, a first diversion valve to selectively direct the pressure from the main valve to the system or to a device to be operated, said first diversion valve normally remaining in position to feed the system, a second diversion valve receiving fluid from the first diversion valve and selectively directing the fluid to the motor in large volume or to one end of the follower in smaller volume, in the latter position moving the follower away from the cam, a line from the follower to the motor opened by the movement of the follower away from the cam to start the motor.

13. The hydraulic system of claim 12, wherein said second diversion valve also directs fluids alternatively to the opposite end of the follower to reverse the same, and a line from the motor outlet to the second diversion valve to reverse the latter upon initiation of rotation of the motor to cut off fluid to the said one end of the follower and to direct fluid directly to the motor for high speed rotation.

14. The hydraulic system of claim 12, including a line from the output side of the motor to the second diversion valve to reverse the latter to cut off fluid to the said one end of the follower and to direct fluid in large volume directly to the motor, a line from the second diversion valve to the opposite end of the follower to cause the latter to press against the cam, and a low spot on the cam which causes additional travel of the follower substantially closing the output side of the motor and slowing the same down by the consequent pressure rise.

15. The hydraulic system of claim 12 including a hydraulic line to the opposite end of the follower to cause the latter to bear against the cam, the latter having slots therein at intervals to receive the follower and lock the motor and cam.

16. The hydraulic system of claim 12 including an adjustable relief valve in the motor outlet side leading to the inlet side of the motor.

ERIC J. HIRVONEN.

References Cited in the file of this patent

UNITED STATES PATENTS

| Number | Name | Date |
|---|---|---|
| 2,366,398 | Harrington | Jan. 2, 1945 |
| 2,380,873 | Schafer et al. | July 31, 1945 |
| 2,443,278 | Stratton | June 15, 1948 |
| 2,453,600 | Soden | Nov. 9, 1948 |
| 2,454,591 | Brady et al. | Nov. 23, 1948 |